May 28, 1935. H. GUTBERLETT 2,003,146
APPARATUS FOR ARRANGING THE FASTENER MEMBERS
OF SLIDING CLASP FASTENERS IN ROWS
Filed Feb. 4, 1933 14 Sheets-Sheet 1
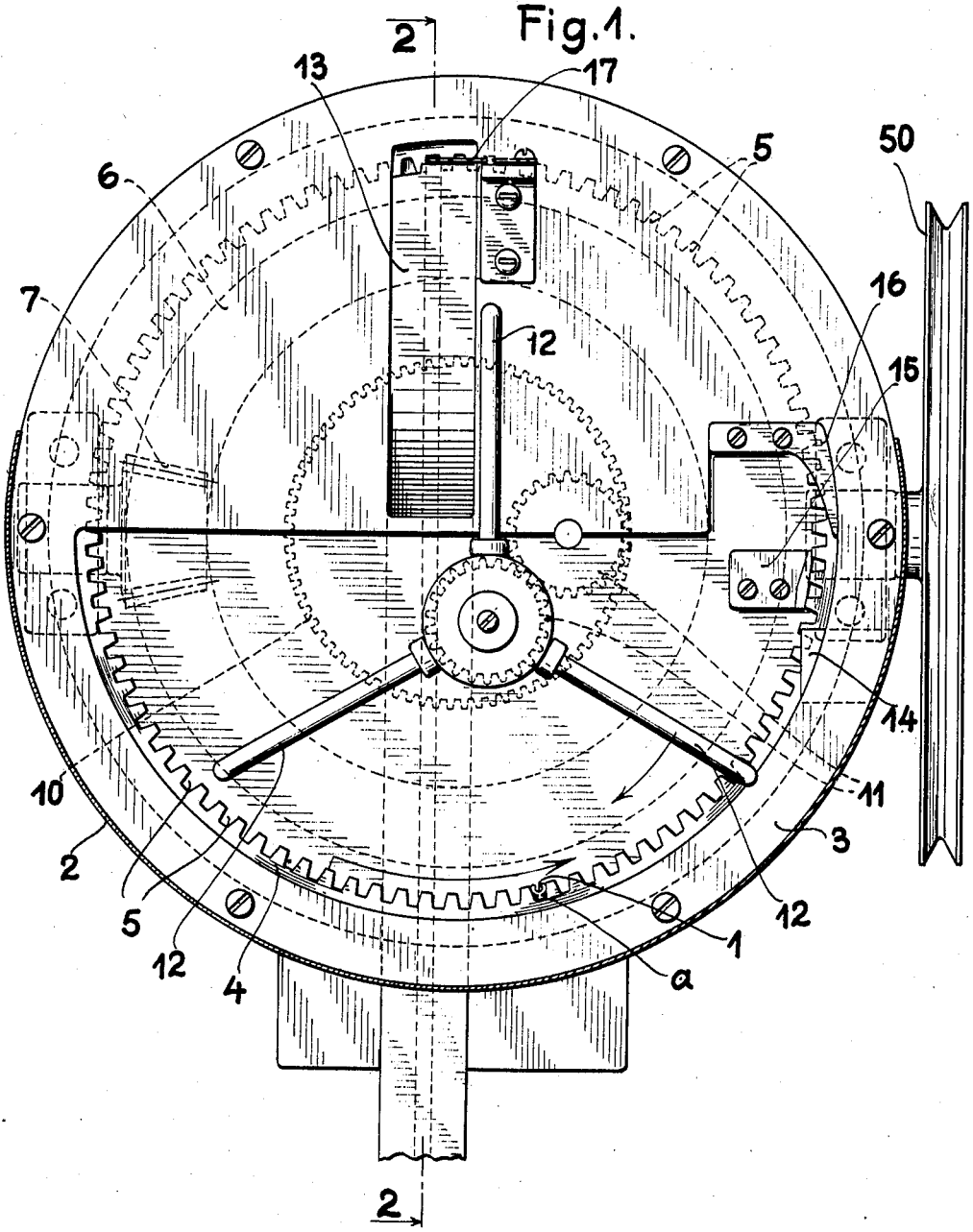
Inventor
HELMUT GUTBERLETT
By
Attorneys

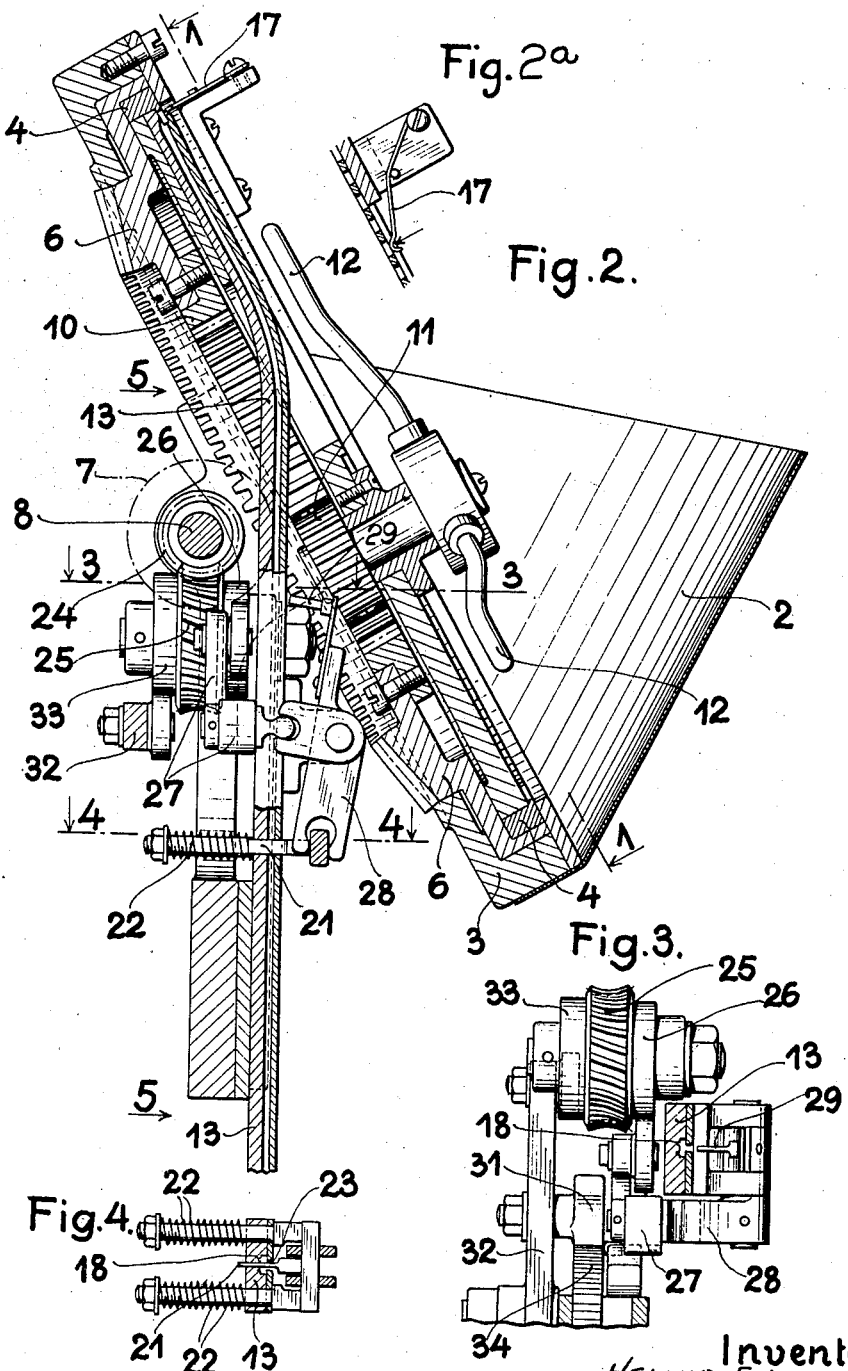

Inventor
HELMUT GUTBERLETT
By
Attorneys

May 28, 1935. H. GUTBERLETT 2,003,146
APPARATUS FOR ARRANGING THE FASTENER MEMBERS
OF SLIDING CLASP FASTENERS IN ROWS
Filed Feb. 4, 1933 14 Sheets-Sheet 4
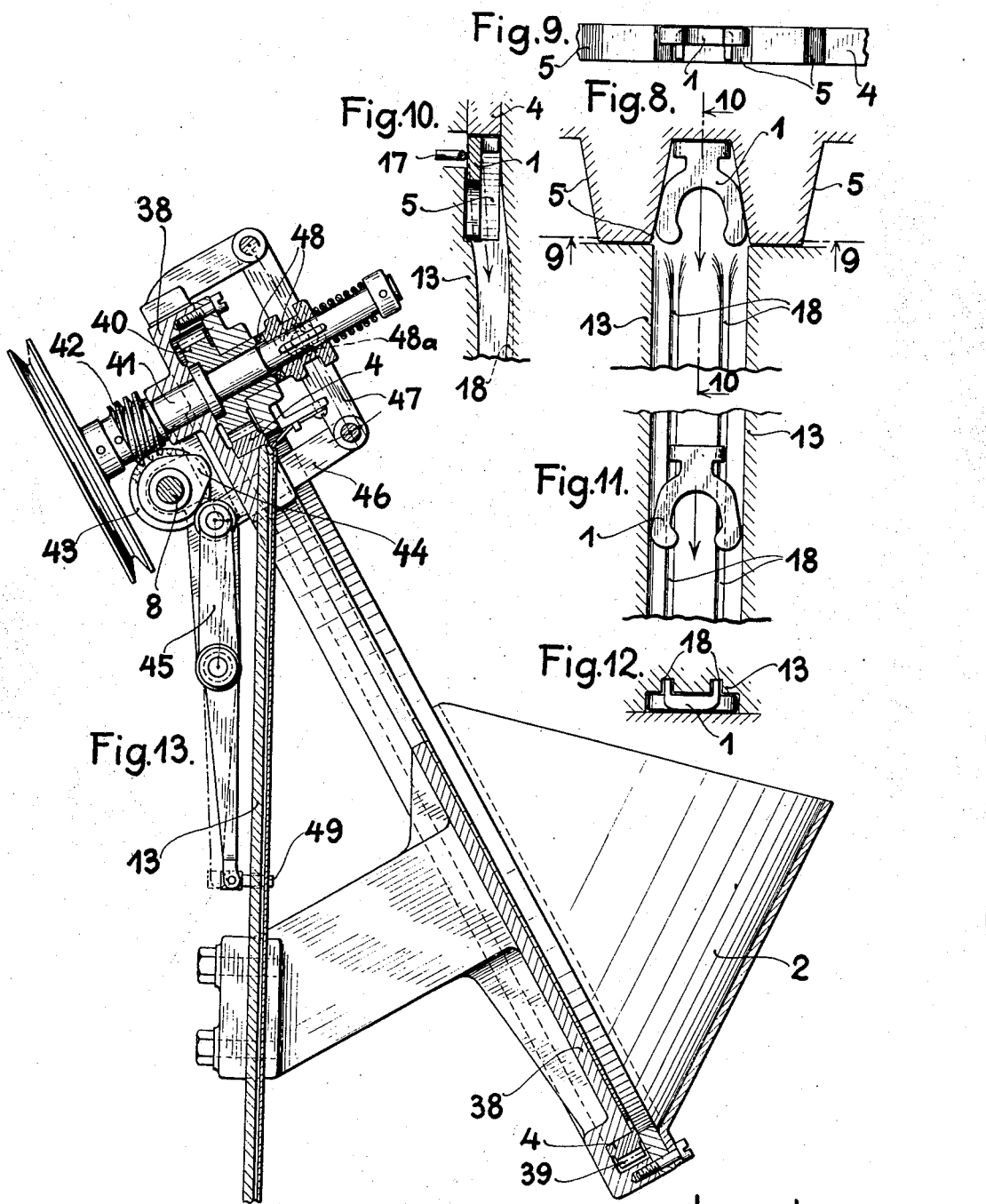
Inventor
HELMUT GUTBERLETT
By
Attorneys

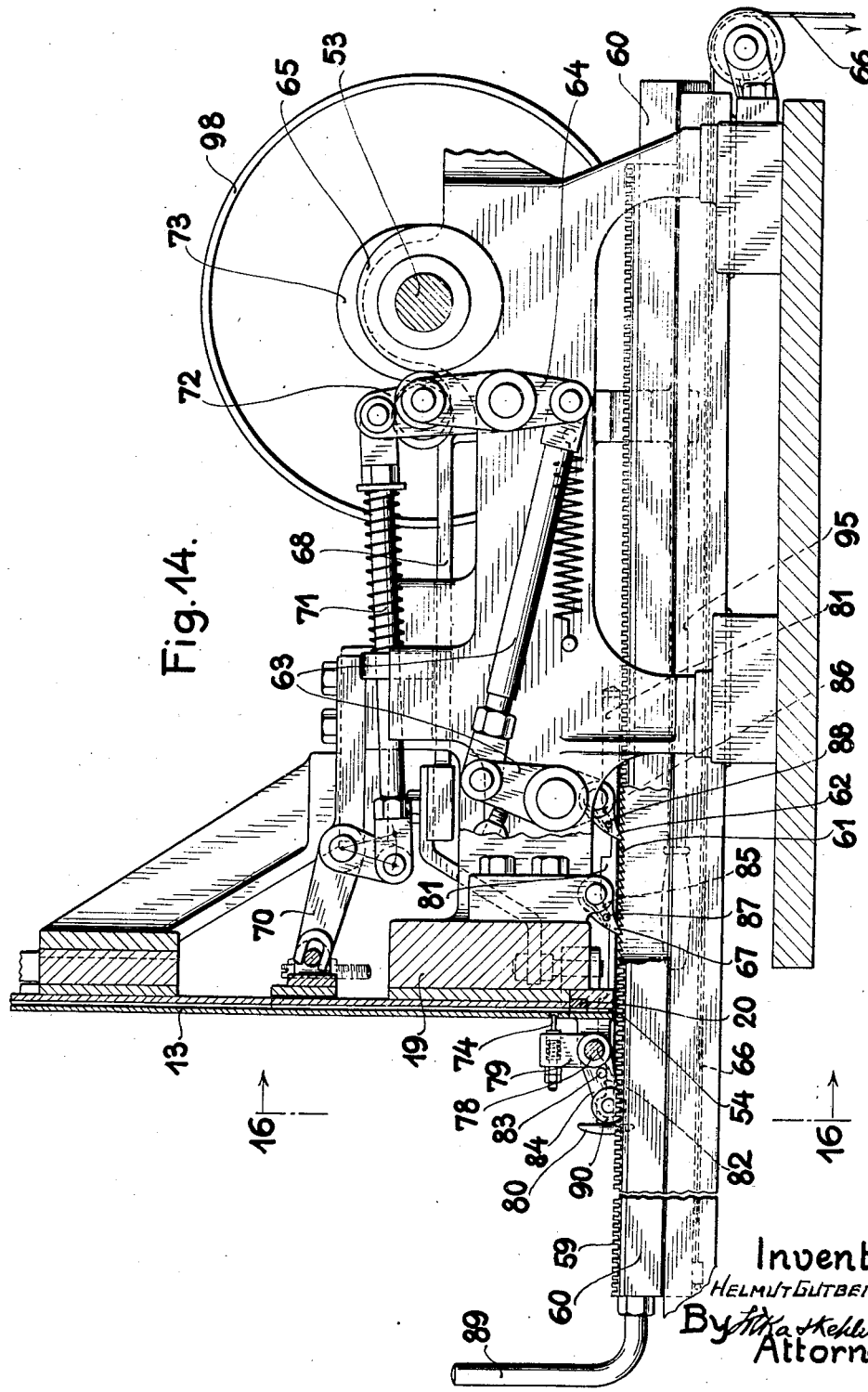

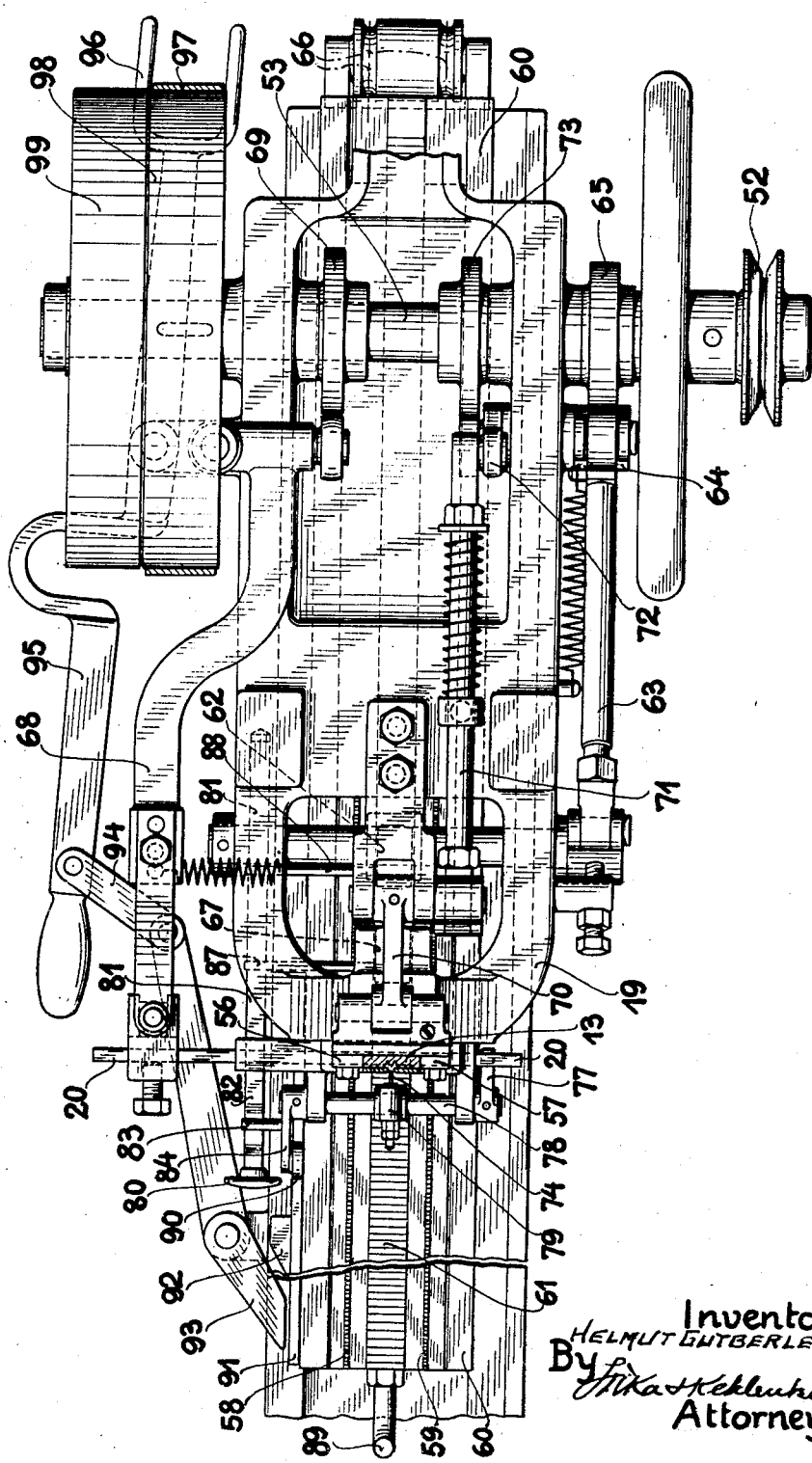

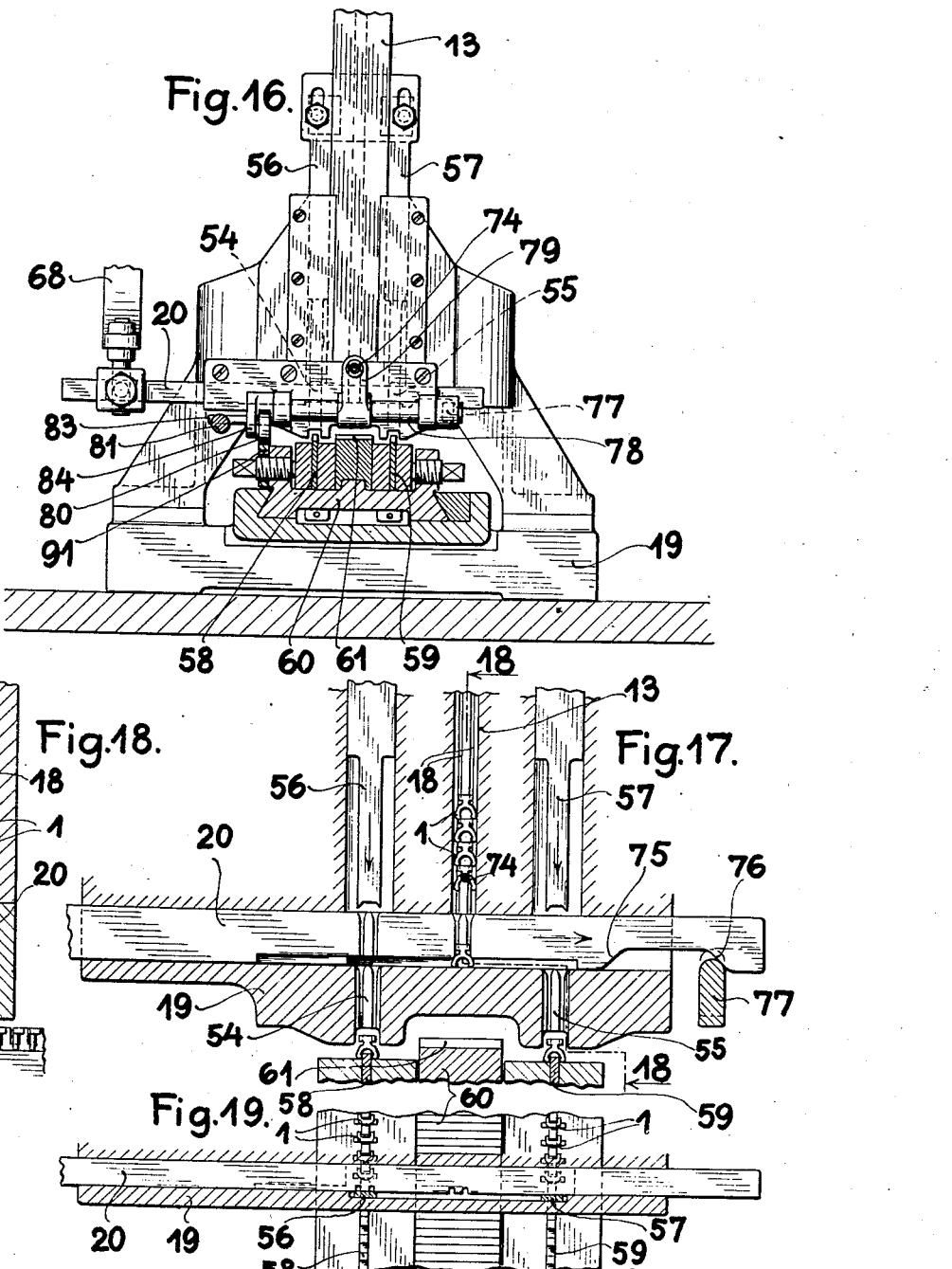

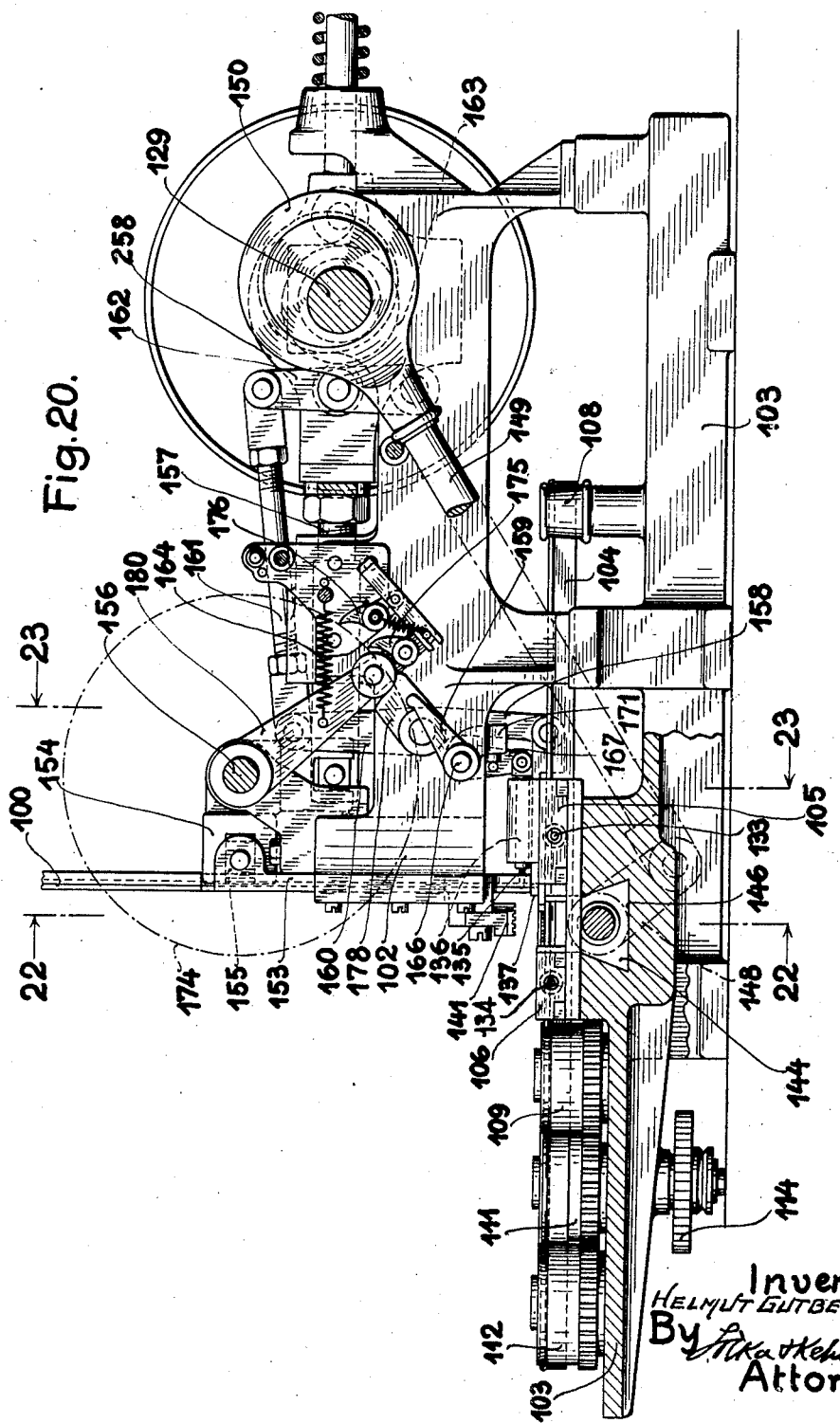

Fig. 21.

May 28, 1935.  H. GUTBERLETT  2,003,146
APPARATUS FOR ARRANGING THE FASTENER MEMBERS
OF SLIDING CLASP FASTENERS IN ROWS
Filed Feb. 4, 1933  14 Sheets-Sheet 10

Inventor
HELMUT GUTBERLETT
By
Attorneys

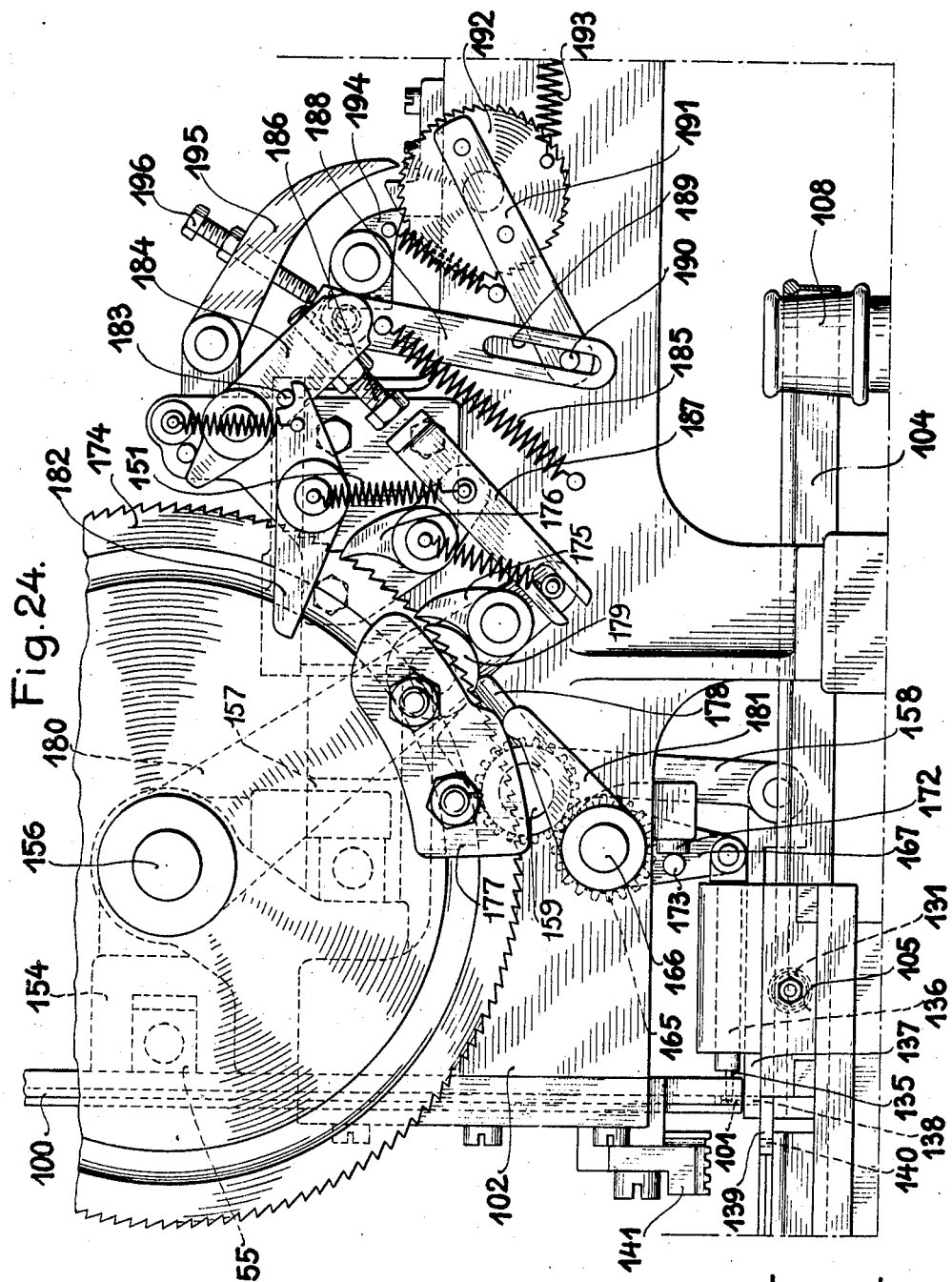

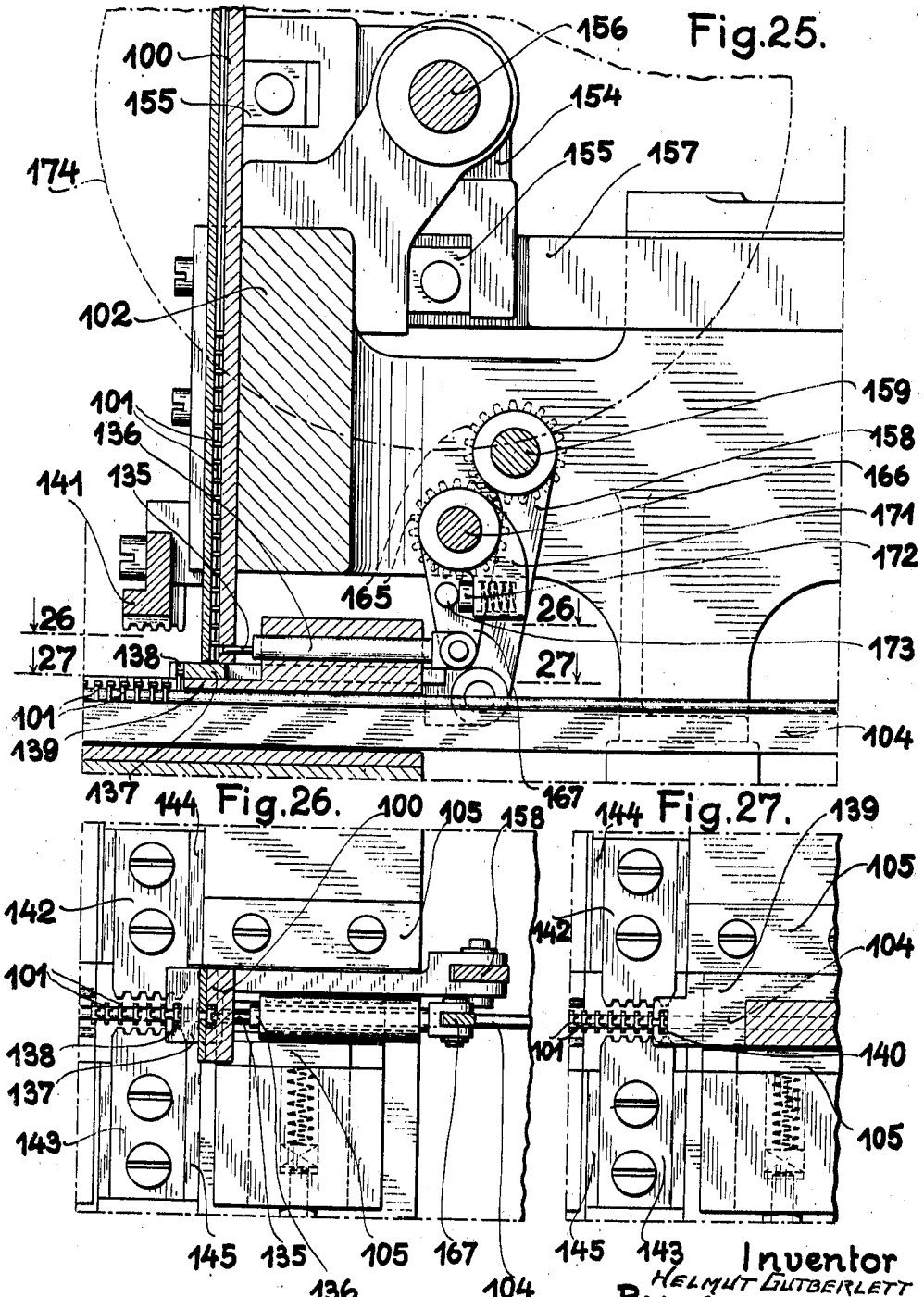

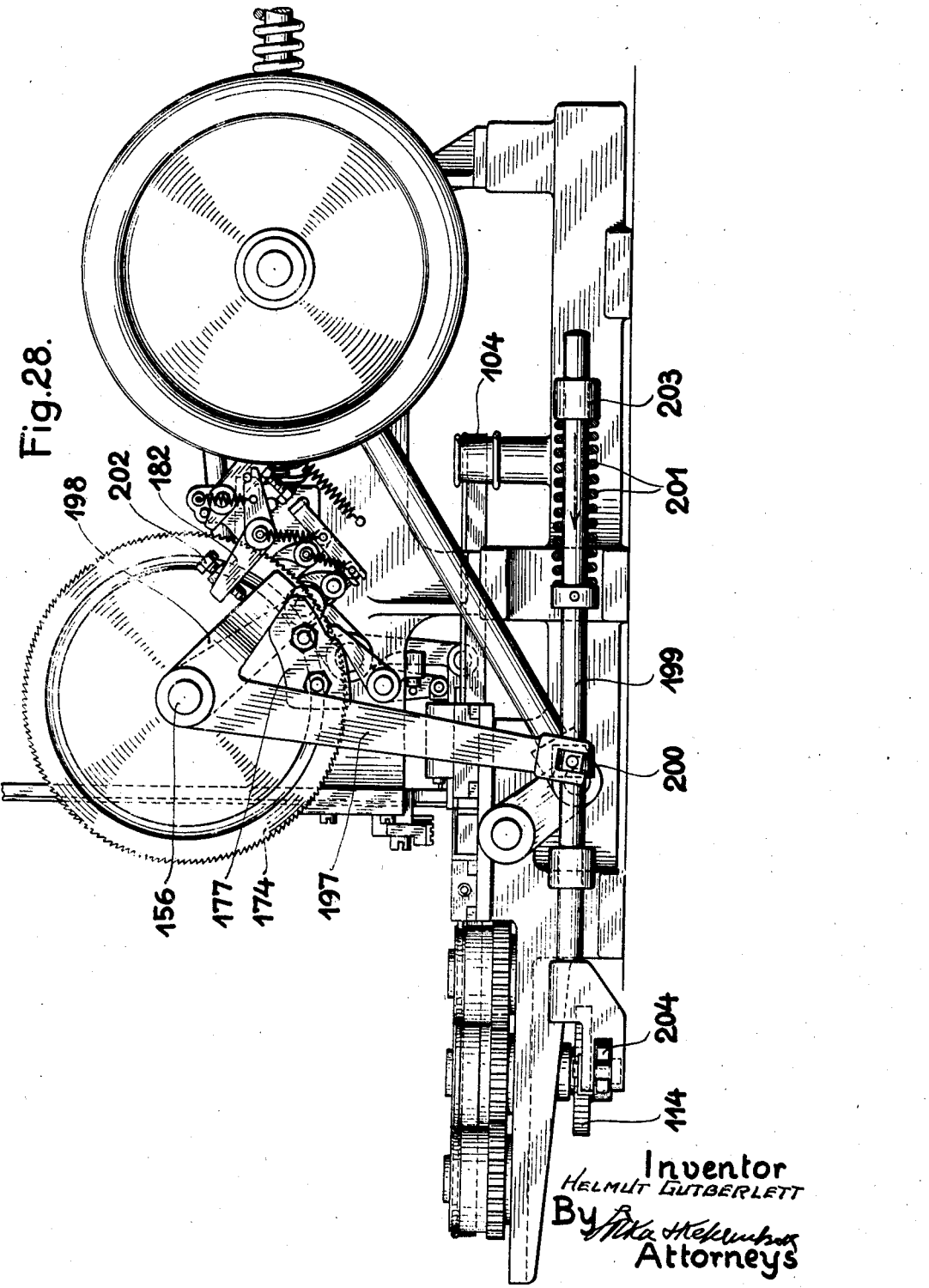

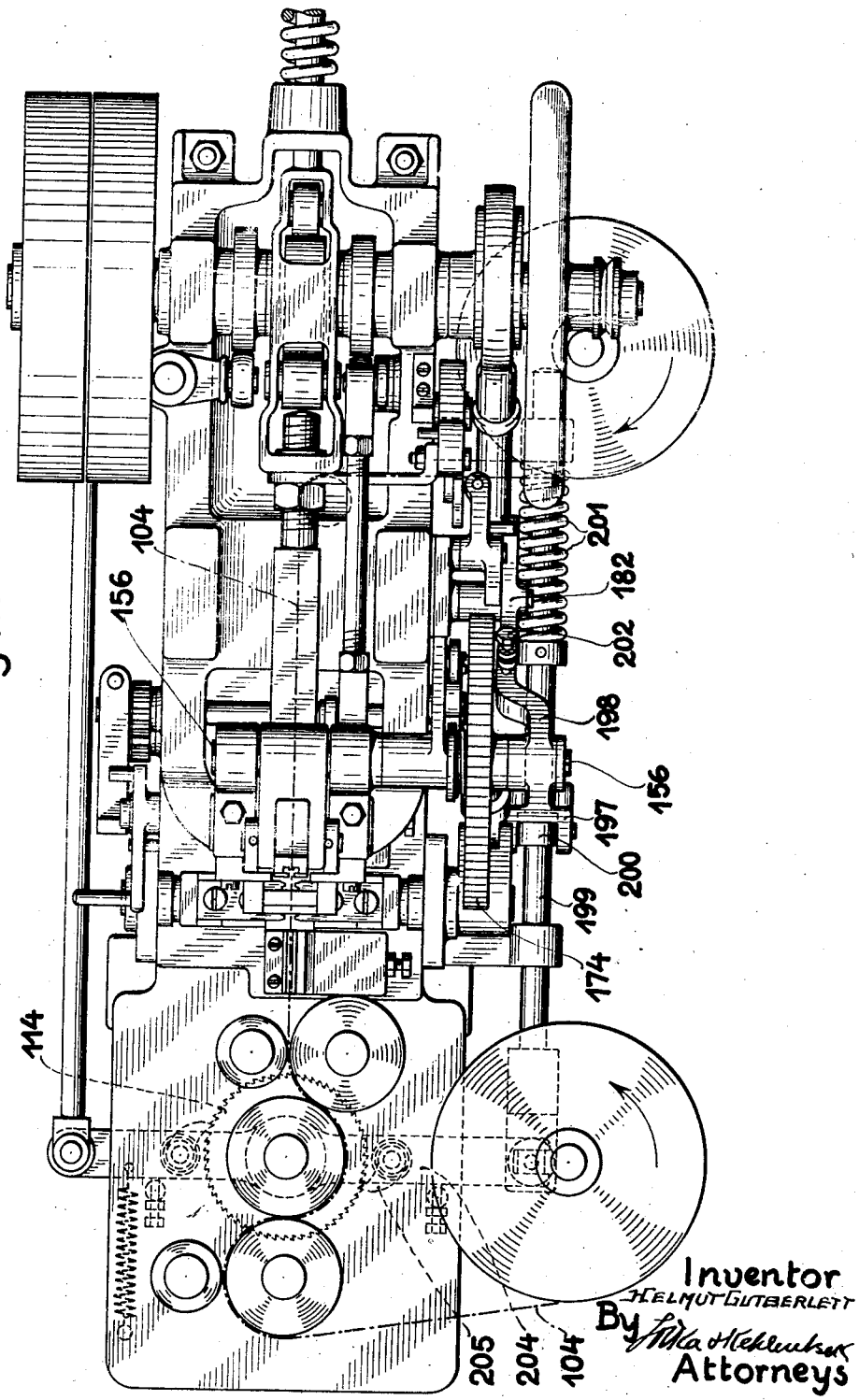

Patented May 28, 1935

2,003,146

UNITED STATES PATENT OFFICE 2,003,146

APPARATUS FOR ARRANGING THE FASTENER MEMBERS OF SLIDING-CLASP FASTENERS IN ROWS

Helmut Gutberlett, Wuppertal-Barmen, Germany

Application February 4, 1933, Serial No. 655,289
In Germany March 14, 1932

23 Claims. (Cl. 153—1)

This invention relates to apparatus for arranging the fastener members of sliding-clasp fasteners in rows. According to the invention, the fastener members lying irregularly in a container are fed consecutively to a distributor by means of a scoop or transfer device, from which fastener members not suitably placed for arranging in rows are again rejected, and brought at equal distances apart onto one or a number of combs arranged in parallel rows or immediately to one or a number of stringers. The regulation of the working of the scoop device, the supply of the fastener members, which are in the correct position for arrangement in rows, to the distributor, and the distribution and arranging in rows of the fastener members, as also the stopping of the apparatus after the conclusion of a working cycle, takes place entirely automatically. Furthermore, inequalities with respect to the delivery of the fastener members to the distributing device and the working of the device for arranging them in rows, are compensated by an automatically acting regulating device.

According to a special construction of the invention, by means of an entirely automatic device, the fastener members, which, after being stamped out of any desired metal plates, may be subjected to any desired treatment and are contained in a vertical storing magazine to which they are fed automatically by a delivery device and sorting device all in the same position with the limbs downward, are set separately in the riding position and at the correct distances apart on a holding device, such as, for example, a stringer, a template comb or the like, moving intermittently in the vertical plane of symmetry of the magazine, being directly clamped by their limbs on the stringer when this is employed. The new device may be so arranged that sections of sliding-clasp fastener members of any desired length with blank intermediate spaces of predetermined lengths can be arranged on the stringer or the like by intermittent interruption of the supply of the members from the magazine, the advance of the stringer or the like taking place either in the same manner as when the members are being set in position or, preferably, by the stringer or the like being released by a rapid operative movement. By means of such an automatic device, considerably greater output is attained than with the hitherto known devices, as all the movements take place with greater speed and, in consequence of the rapid action, only very short pauses take place in the forming of the rows.

Constructions of the improved apparatus are shown in the accompanying drawings.

Fig. 1 shows the upper part of one form of the apparatus with parts in section on the line 1—1 of Fig. 2; Fig. 2 shows a vertical section thereof on the line 2—2 of Fig. 1;

Fig. 2ª is a fragmentary detail section of a device forming part of the mechanism;

Figs. 3 and 4 show horizontal cross-sections thereof taken respectively on the lines 3—3 and 4—4 of Fig. 2;

Figs. 8-12 show details in various sectional views, Fig. 9 being a top view looking downward from the plane indicated by the line 9—9 in Fig. 8 and Fig. 10 being a section on the line 10—10 of Fig. 8.

Fig. 13 shows a second construction of the upper part in vertical section.

Figs. 14 and 15 show a construction of the lower part of the apparatus in plan and elevation respectively, with parts in section, Fig. 16 shows a corresponding cross-section on the line 16—16 of Fig. 14, and Figs. 17-19 show various partial sections to demonstrate the method of operation of this part of the apparatus.

Figure 21:
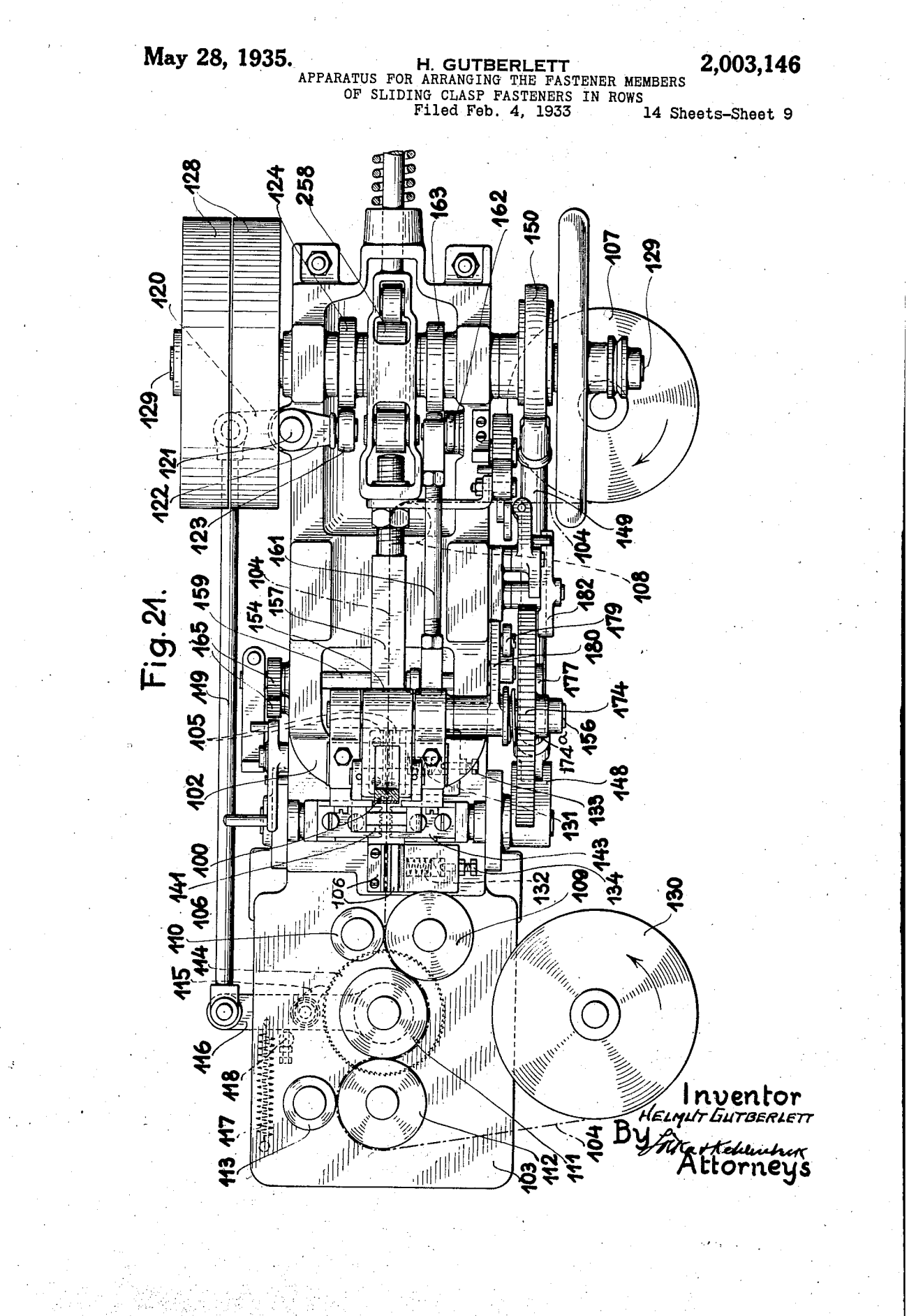
Figure 22:
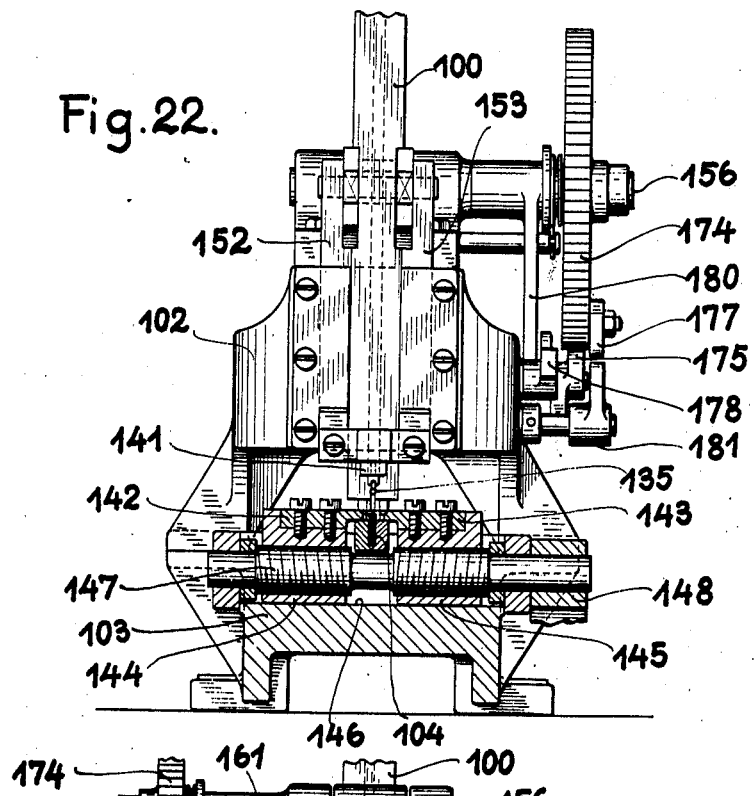
Figure 23:
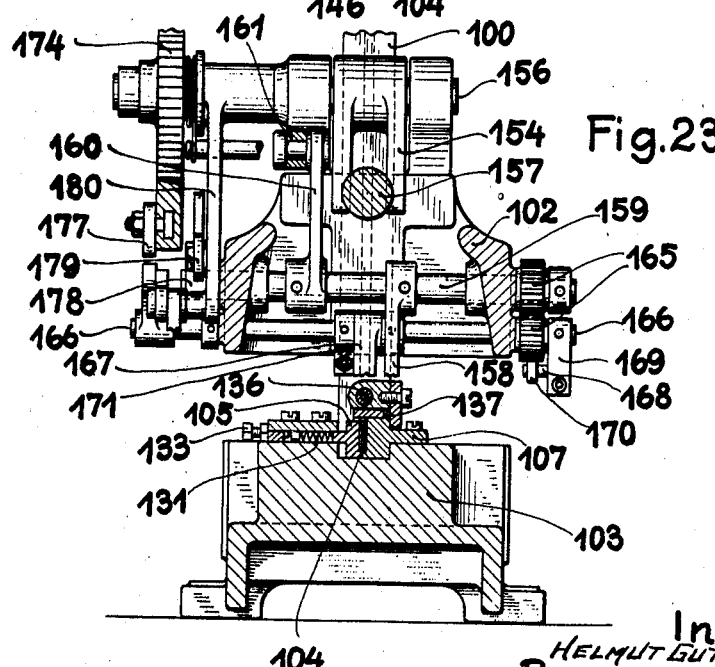

Fig. 20 is a vertical longitudinal section through the setting-on device of a further construction, Fig. 21 is a plan view thereof partly in section, Fig. 22 is a vertical section taken on the line 22—22 of Fig. 20, Fig. 23 is a vertical section taken on the line 23—23 of Fig. 20, Fig. 24 is a side elevation of the arrangement of the stringer divider, Fig. 25 shows in longitudinal section the details of the setting-on device, Figs. 26 and 27 show horizontal sections taken respectively on the lines 26—26 and 27—27 of Fig. 25; and Figs. 28 and 29 are, respectively, a side elevation and plan view of a second embodiment with rapid movement for the blank intermediate portions of the stringer.

Figure 5:
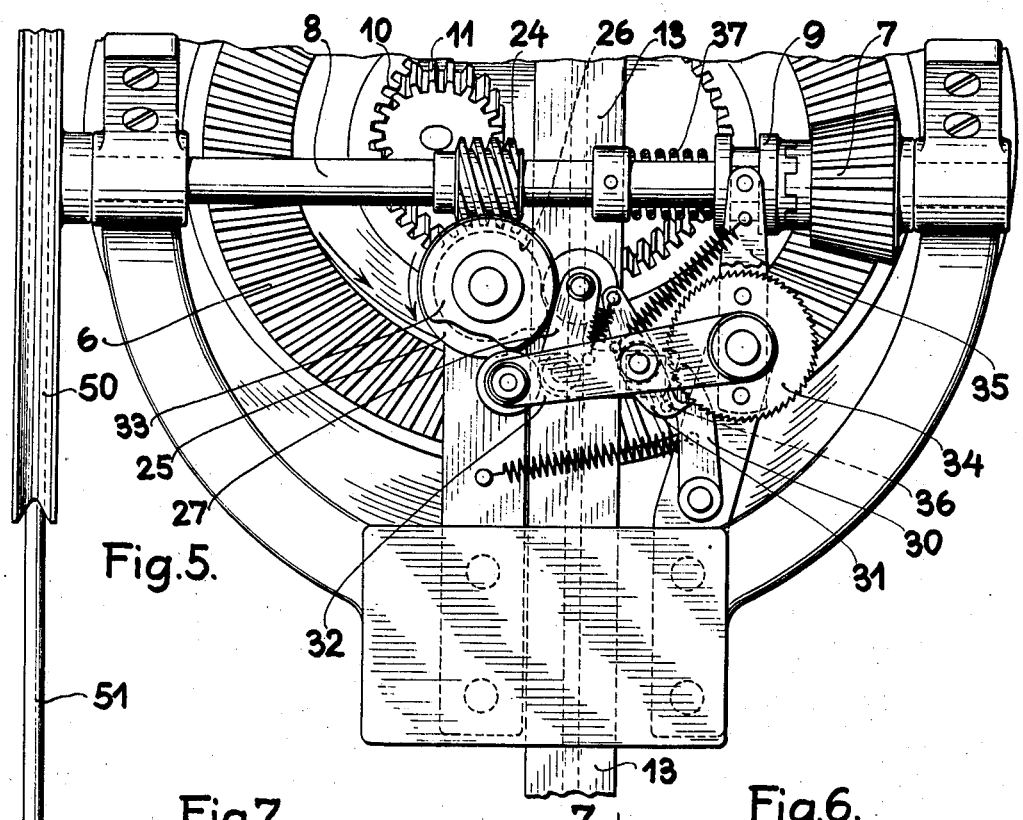
Figs. 5-7 show two rear elevations with the parts in two positions and a cross-section on the line 7—7 of Fig. 6 to correspond.
Figures 6, 7:
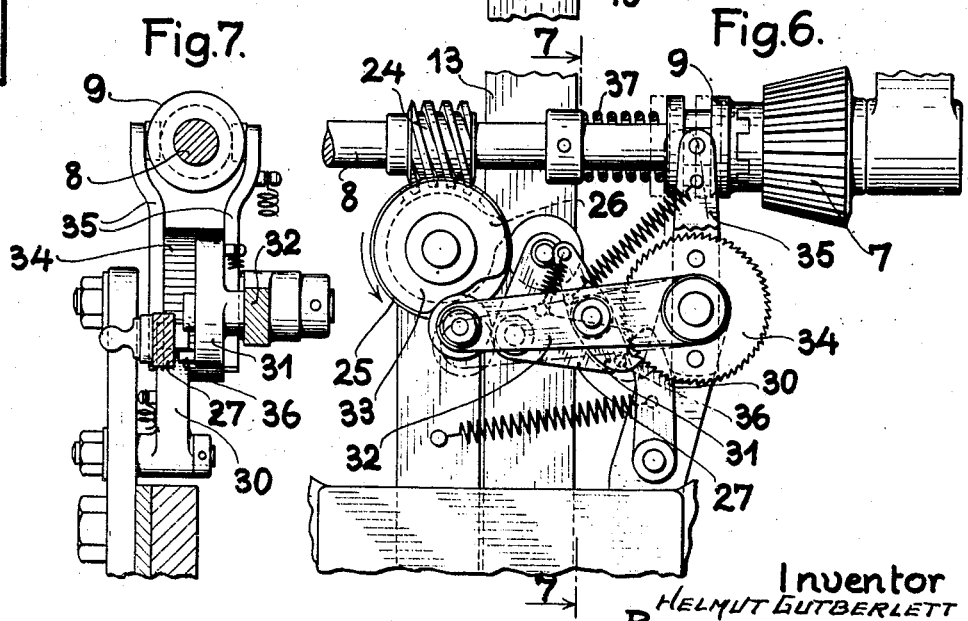

The fastener members 1 (Figs. 1-12) are held in a mixed-up state in a container or hopper 2 which is fitted on an inclined housing 3 serving to accommodate the rotating scoop or transfer device. This latter consists of a ring 4 formed with recesses 5 in the manner of an internal gear and secured to a bevel gear 6 which is driven by means of the bevel pinion 7 from a shaft 8 through a clutch 9. Toothed gearing 10, 11 drives stirring blades 12 in the container 2. On the rotation of the ring 4, the recesses 5 take up the fastener members. When these lie in the recesses in the position as shown at *a* (Fig. 1) they are carried along and delivered to the upper end of a slide groove or chute 13 by which said fastener members are transferred to the point of discharge. All fastener members which are otherwise disposed are again thrown out by ejectors 14, 15, 16. If, for example, the V-shaped rear portions of the fastener members or the small hook-like projections thereof project beyond the recesses 5, these parts come into contact with the ejectors 14 or 16, while when the parts project radially inward from the recesses, the corresponding fastener members slide up on the ejector 15 and then drop down. The fastener members 1 reaching the slide groove 13 are forced by a spring 17 out of the position shown in Fig. 10 into the position shown in dotted lines therein and then slide down in the chute 13, the prongs being guided in channels 18. At the lower part 19 of the apparatus they drop onto a transverse slide 20 and the fastener members 1 gradually pile up on one another until they have approximately reached a feeler 21. The latter is normally drawn transversely by springs 22 through a slot 23 in the wall of the chute 13, and by means of a worm and wormwheel gear 24, 25, a cam disc 26, a bell-crank lever 27 and a lever 28 movable transversely thereto, is retracted from the chute 13 at each revolution of the ring 4, said feeler 21 being subsequently again moved back by the springs 22. During the retraction of the feeler 21 a pin 29 movable into and out of the chute 13, in opposed relation to the feeler 21, holds back the subsequently falling fastener members in the manner of an escapement device. Should the chute 13 be filled up to such an extent that the retracted feeler 21 in moving back into the chute 13 strikes against the row of fastener members and is thus held in the retracted position, the clutch 9 is disengaged for a single revolution of the ring 4 owing to the fact that a spring-urged lever 30 is held pressed back in the position shown in Fig. 6 by the bell-crank lever 27, and a pawl 31, which is actuated by means of a lever 32 from a second cam disc 33 on the worm-wheel 25, engages in teeth 34 of the coupling lever 35 and disengages the clutch, see position shown in broken lines in Fig. 6. When the row of fastener members descends in the chute 13 the feeler 21 again enters the groove and the spring-urged lever 30 lifts the pawl 31 out of engagement with the teeth 34 by means of a stop pin 36, so that the clutch 9 is again engaged by the action of the spring 37.

In the cnstruction of Fig. 13, the ring 4 is mounted rotatably in a plate 38 and provided with a rim of gear teeth 39. A pinion 40 on a shaft 41 engages the rim of gear teeth 39. The shaft 41 is driven by the shaft 8 and a worm gear 42, 43, whereby a lever 45, operated by a cam 44 actuates levers 46, 47 for engaging and disengaging by pins 48a a clutch 48, which is driven by the shaft 41 and drives the pinion 40. The lever 45 also moves the feeler 49 into and out of the chute 13.

The shaft 8 is set in rotation through the cord or belt drive 50, 51, 52 from the main driving shaft 53 on the lower part 19 of the apparatus, from which latter shaft also the device for arranging the fastener members 1 in a row is driven. The lowermost members 1 are carried by the slide 20 alternately into spaced grooves 54, 55 located parallel to each other, down which said members are forced by vertically reciprocable slides 56, 57 onto the combs 58, 59. The latter are located on a slide 60 which by means of teeth 61 and ratchet gear 62, 63, is moved tooth by tooth to the left in Figs. 14 and 15 by a lever 64 and a cam disc 65 on the shaft 53, against the action of a weight suspended on the cord 66, a detent pawl 67 retaining the slide 60 against return movement.

The horizontal slide 20 is controlled through a lever 68 and a cam disc 69 from the shaft 53, while the vertical slides 56, 57 are moved through linkage 70, 71, 72 from a third cam disc 73 on the shaft 53. The last but one fastener member at the lower end of the groove 13 is held by a pin 74 until the slide 20 is ready to take another fastener member. The pin 74 is controlled by wedge surfaces 75, 76 on the slide 20 itself, which surfaces act on the lever 77 to rotate the shaft 78 with the lever 79 holding the pin 74. At the end of a working cycle, the pile of fastener members can be held stationary by hand by means of a slide 81 provided with a handle 80, a lifting surface 82 on this slide raising by means of a pin 83 a second lever 84 on the shaft 78. At the same time, by means of lifting surfaces 85, 86 and pins 87, 88 the pawls 62, 67 are also lifted, so that by manipulating the handle 89 the slide 60 can be brought back, this movement being assisted by the counterweight, into the initial position.

It is also possible to divide the fastener members arranged in two rows on the combs 58, 59 into such groups as correspond to the length of the sliding clasp fasteners to be made. For this purpose, a roller 90 on the lever 84 runs on a template rail 91. This rail is provided at the necessary points with rises by means of which the downward movement of the pile of fastener members in the chute 13 is arrested at intervals through the medium of the pin 74 so that gaps are formed between the adjacent rows of fastener members.

At the end of a working cycle, the drive of the machine is automatically disengaged, a wedge-shaped stop 92 on the slide block 60 then coming into contact with a lever 93 and rocking the latter in such manner that by means of linkage 94, 95, the belt fork 96 is shifted to bring the driving belt 97 from the pulley 98 which is fast on the shaft 53 onto the pulley 99 which is loose thereon.

The construction of Figs. 20 to 27 shows also a vertical magazine or chute 100, the free cross-section of which corresponds to the cross-section of the fastener members which are to be arranged in rows, and which is filled with such fastener members 101 one above the other in the perpendicular position with the limbs directed downwardly. The magazine 100 is supported on a block 102 which is fixed above the table plate 103 of the machine frame. Above this table plate a stringer 104 is intermittently advanced, beneath the magazine between guide cheeks 105, 106, in the vertical plane of symmetry of the magazine with the thickened edge upwards, the stringer unwinding from a roller 107, fitted at the side of the machine frame and braked by means of a spring, and being carried round a guide roller 108. The pull which advances the stringer is exerted behind the fixing-on position by pairs of rollers, with vertical axes, which bear with spring pressure against the stringer provided with fastener members, beneath the latter, while the fastener members pass freely through suitably shaped grooves at the upper ends of the rollers. These rollers 109 to 113 are driven by ratchet gearing consisting of the ratchet wheel 114, the pawl 115, the ratchet lever 116, which is drawn back by a spring 117 up to the set screw 118, and the driver rod 119, which is pivotally attached to the ratchet lever 116 at the outer end thereof. The driver rod obtains its movement through a lever 120, which is secured on the lower end of a vertical shaft 121 on the upper end of which there is secured a lever 122 which forces the roller 123 fitted thereon against a cam disc 124 secured on the main shaft 129 which is driven by belt pulleys 128. With each revolution of the main shaft 129, the ratchet wheel 114 is rotated by an amount which corresponds to the feed of the stringer by two members or one division, for the stringer is carried between the rollers 109 to 112 driven by the ratchet wheel 114 through the intermediary of toothed wheels. The finished stringer parts are wound up behind these rollers on a reel 130 fixed on the frame at the side thereof and driven by means of a cord pulley.

The above-mentioned guide cheeks 105 and 106 are arranged in front of and behind the press cheeks, respectively, and are suited to the cross-section of the stringer 104. One side of the cheeks remains fixed, while the opposite cheek is pressed by springs 131 or 132 against the stringer 104. By means of screws 133, 134, the spring pressure can be so adjusted that the stringer is held flattened and tensioned at the point where the fastener members are set thereon.

For setting the separate fastener members onto the stringer controlled as above described, use is made of a feed and press device fitted above and on both sides of the stringer at the lower end of the magazine, which device is constructed as follows: The magazine 100 terminating at a short distance from the upper edge of the stringer 104 is provided at the lower end with a horizontal hole, located in the vertical plane containing the stringer, for the passage of a pin 135, which is fitted at the end of a plunger 136 adapted to slide in a horizontal guide and upon which rides the last but one fastener member in the magazine, so that the members above this in the magazine are held back. When this pin 135 is drawn back out of the magazine, the member previously held fast thereby falls in the vertical position into a feeder 137 and the members disposed above it in the magazine 100, up to a feeler pin passing therethrough, drop correspondingly. The feeder 137 has for instance a T-shaped slot 138 formed therein so that the shank-portion opens on the front edge of the feeder, this slot receiving the fastener member, and rests on a guide 139. The said member drops in the perpendicular position into this slot, and is supported with its limbs on the guide plate 139. When the feeder is now pushed forward, it carries with it the fastener member disposed in the slot 138, while sliding under the next member in the magazine, and carries it over a similar T-shaped slot 140 on the front of the guide plate 139, which slot then coincides with the slot 138 of the feeder 137. The slots 138, 140 are then opposite the stringer in such a position that the fastener member 101 is vertically disposed above and in exact registry with the point on the stringer at which it is to be set. The end tooth of the upper jaw 141 which is movable in a vertical path, now enters the slots 138, 140 above the fastener member situated therein, pushes this member out of the slots and forces it with the limbs leading onto the thickened edge of the stringer, whereupon lateral jaws 142 and 143 press the limbs in underneath the said edge. All the jaws are so made that, in addition to the fastener member being secured, a number of already fixed fastener members are simultaneously gripped.

The separate movements of the jaws 141, 142 and 143, of the pin 135 and of the feeder 137 take place at such moments that, during the upward and lateral return movements, respectively, of the jaws, the feeder 137 stands with the slot 138 underneath the magazine 100, so that the lowermost fastener member located under the pin 135 falls into the slot. As long as the jaws are open, the feeder is moved forward into the position in which the slot 138 is located above the slot 140 of the guide 139, and simultaneously the pin 135 is drawn back out of the magazine 100, whereupon the fastener members in the magazine descend by the length of a member down to the upper surface of the feeder. During the stoppage of the feeder in the last-mentioned position, the fastener member which is in the slots 138, 140 has its limbs pressed by the press jaw 141 over the stringer 104 and the jaw 141 then remains stationary under pressure and the lateral jaws 142, 143 move towards each other, pressing the limbs of the fastener member into the stringer material, while at the same time the feeder 137 and the pin 135 move back into their initial position, the pin passing through between the limbs of the last but one fastener member in the magazine and the last fastener member, commencing the cycle again, falling into the slot 138, the jaws opening and the stringer 104 being pushed forward by one division.

The drive of the lateral press jaws 142 and 143, the teeth of which at the top are inclined at an angle of 30° to the horizontal, is effected by means of slides 144, 145 which run in a guide 146. The slides are moved towards and away from each other by means of a screw spindle 147, having right and left-handed threads, in threaded engagement with said slides 144, 145 respectively. The spindle 147 is journalled in the table plate 103 so as to be nondisplaceable axially and is provided at one end with a crank arm 148 to which is pivoted a connecting rod 149 driven by an eccentric 150 mounted on the main shaft 129 in such manner that with each rotation of the latter the jaws 142, 143 are opened and closed once.

The upper press jaw 141 with teeth also inclined at 30°, which teeth correspond exactly with the teeth of the lateral jaws, is fitted bridge-like transversely to and connects together the two slides 152, 153 which are arranged on both sides of the magazine on the block 102 of the frame. The magazine 100 thereby remains free for better inspection and the supervision of its filling. The drive of the slides 152, 153 takes place through the bell-crank lever 154 which is connected by the slide blocks 155 with the slides 152, 153 and is fitted on a shaft 156 carried in a forked part of the block 102 behind the magazine 100. The second limb of the bell-crank lever 154 is engaged by a connecting rod 157 which obtains its drive through an eccentric 258 on the main shaft 129, which eccentric rotates between rollers of a strap enclosing the eccentric and fixed on the connecting rod. The upper press jaw is thereby moved up and down once with each revolution of the main shaft.

The drive of the feeder 137 takes place through a lever 158 which is fixed on a shaft 159 and is pivoted at the lower end to the feeder, while the shaft 159 is rocked by a lever 160 fixed thereon and pivoted to a connecting rod 161 which is pivoted to a roller lever 162, the roller of which runs on a cam disc 163 fixed on the main shaft 129. The roller is pressed onto said disc by a tension spring 164. With each revolution of the main shaft 129 the feeder therefore moves backward and forward once.

The drive of the dividing pin 135 also takes place by means of the eccentric 163. As, however, the pin must be drawn back when the feeder moves forward, the movement of the shaft 159 is transmitted in the reverse direction by toothed wheels 165 on this shaft and on a shaft 166, to the latter, on which is loosely fitted a lever 167 moving the plunger 136. Of these toothed wheels 165 the driven wheel fits loosely on the shaft 166 and is coupled with this by means of a lever 169 secured on the shaft 166 and provided with a lateral pin 168 and a pin 170 extending radially from the toothed wheel 165 (Fig. 23). The pin 168 on the lever 169 is constantly pressed onto the pin 170 by a spring. As the pin 135, owing to the irregular dropping of the members into the feed slot, might, instead of coming between the limbs of the last but one member, come onto the head of the last member, the drive of the pin is made elastic in such manner that a second lever 171 which is fixed on the shaft 166 drives the lever 167 through the intermediation of a spring-pressed plunger 172 and a cross pin 173 fitted on the lever 167, whereby the plunger 136 pivotally connected with the latter together with the pin 135 is also driven. If the pin 135 meets with resistance, the lever 167 remains stationary and the spring-pressed plunger 172 moves backward and forward. As will be shown later, use is also made of these devices during the free running of the stringer 104.

The setting of the fastener members on the stringer as previously described must be interrupted from time to time in order that free parts of definite lengths may be left on the stringer between sections of definite lengths provided with the members, such spaces being necessary for fixing the sliding clasp fasteners onto the objects on which they are to be used. The automatic device serving for this purpose consists of a ratchet wheel 174 which is mounted for easy rotation on the shaft 156 and is rotated by a spiral spring 174a in the direction opposite to the ratcheting direction when the ratcheting is interrupted by the disengagement of a ratchet pawl 175 and a counter pawl 176. This ratchet wheel 174 is provided on its side with a circular groove in which is arranged a stop 177 adapted to be adjusted in said groove and fixed therein by clamping screws. The ratchet wheel is driven during the fixing of the fastener members on a section, by the main shaft 129 through the cam disc 163, the roller lever 162, the connecting rod 161 and the lever 160; the resulting oscillation of the shaft 159 on which is keyed a lever 178 having an off-set front surface which engages a roller 179 on a lever 180, rocks this lever and moves forward the ratchet pawl 175 mounted thereon, so that with each rotation of the main shaft the ratchet wheel is rotated by one tooth in a counter-clockwise direction. The back pressure due to the spiral spring 174a above mentioned is taken up by the counter pawl 176 carried on the block 102. When, after a predetermined number of strokes of the ratchet pawl 175, or rotations of the main shaft 129, during the execution of which the same number of fastener members have been fixed on the stringer, the desired length of the fastener section is reached, the stop 177 has come into a position where it rocks a lever 181, which is mounted with the dividing lever 167 on the shaft, to such an extent that the pin 135 is held back in the magazine as long as that surface of the stop 177 which is concentric to the ratchet wheel 174 remains in contact with the lever 181. The feeder 137 therefore obtains no supply from the magazine and the stringer runs forward intermittently in the same way without fastener members being set thereon. The point of the stop 177 then strikes against a lever 182 and rocks this against the pull of a spring, as a result of this operation a pin 183 on a lever 184 is disengaged and this lever, under the tension of a spring 185, is rocked to such an extent that a set screw 186 mounted thereon strikes a rail 187 and moves it so far that the detent or counter pawl 176 hinged thereon and also the ratchet pawl 175, the tail of which engages by means of a pin with a fork of the rail 187, are disengaged. At this moment, the ratchet wheeel 174 is released and rotated back by the spiral spring 174a, the lever 181 being also released and again starting the drive of the pin 135. In the meantime, the pin 135 stops in the above described position and the driven toothed wheel 165 rocks idly backwards and forwards. In consequence of this arrangement of the toothed wheel drive, the pin 135 can also be held by hand in the locked position when required. In order now that the ratchet wheel 174 may have time to return under the action of its spiral spring 174a into its original position, which position is defined by a fixed stop, before its ratchet gearing again engages, a bar 188 is pivotally connected to the end of the lever 184, the tension spring 185 already mentioned being secured to the said bar 188 which is provided at the lower end with a slot 189. In this slot engages a pin 190 of a bar 191 mounted on a ratchet wheel 192, which is urged by a spring 193 in a direction opposite to the ratcheting direction. A ratchet pawl 194 driven by the main shaft 129 tends constantly to rotate this ratchet wheel, but the spring 193 rotates it back again after each stroke. On the disengagement of the lever 184 and its rocking downwards, a detent 195 which is supported by a set screw 196 upon the lever 184 comes into engagement with the ratchet wheel 192, and the latter is consequently rotated against the pull of the spring 193. Hence, the pin 190 of the bar 191 moves upwardly in the slot 189 of the bar 188, meets with the end of the slot and raises the bar 188 so far that it brings back the lever 184 and with it the stop lever 182 into the ratcheting position. Thereby finally, the set screw 196 and the detent 195 are raised, or lifted from the ratchet wheel 192, and this is at once rotated back by the spring 193 into the initial position. By the raising of the bar 188 and rocking of the lever 184, the set screw 186 is also raised, and the rail 187 rocks, under the pull of the spring 151, the ratchet pawl 175 and the detent 176 into the working position, and the ratcheting of the wheel 174 begins afresh. The result attained by the slot 189 of the bar 188 is that a number of movements of the ratchet wheel 192 are without effect on the bar 188, and the latter, raised as a further ratchet movement takes place, effects the changes only after the upper end of the slot 189 has been engaged by the pin 190. During these revolutions of the main shaft, the ratchet wheel 174 has sufficient time to return into its initial position and it is thereby ensured that the lengths of the fastener member sections result according to the adjustment of the stop 177 and that the lengths of the blank intermediate spaces are of exactly the same size. It may be noted that the first-mentioned lengths may be selected as desired, while the lengths of the intermediate spaces remain the same.

Due to the continuous uniform ratcheting of the stringer, the time taken up in the movement of the blank portions between the fastener member sections is somewhat long, and there is consequently provided an apparatus by means of which this period is shortened (Figs. 28, 29). On the outer end of the shaft 156 there is loosely mounted a fork lever 197, 198 of which one arm 197 engages fork-wise at its lower end the pin of a carrier 200 secured on a connecting rod 199 and the second arm 198 of which, slightly staggered in the axial direction, is spaced but a short distance from the flank of the ratchet wheel 174 so that it is carried along by the stop 177 which abuts against it with its face, whereby the connecting rod 199 is forced backwards against the action of a spring 201 and the latter is thereby tensioned. As soon as the arm 198 strikes against a set screw 202 of the lever 182 and by the rocking thereof the ratchet and locking pawls of the ratchet wheel 174 are disengaged, the stop 177 together with the ratchet wheel jumps back and the spring 201 is thereby released, which spring bears against a projection 203 of the frame, forces the connecting rod 199 to the left in Figs. 28 and 29 and rocks a second ratchet lever 204 provided with a ratchet pawl 205 and mounted on the shaft of the ratchet wheel 114 whereby the stringer is moved forward by the length of the blank intermediate spaces. The concentric part of the cam member acting as stop can consequently be made much shorter as the time of the movement of the stringer at the blank places, during which the magazine must be closed, is considerably reduced.

I claim:—

1. In an apparatus for arranging the fastener members of sliding-clasp fasteners in rows, the combination of a hopper for containing a supply of fastener members, a rotatable annular transfer device provided with regularly spaced recesses on its inner surface for receiving individual fastener members from said hopper, ejecting means co-operating with said transfer device for automatically removing improperly positioned fastener members therefrom, a chute to which said fastener members are delivered by said transfer device, and means for receiving said fastener members from said chute and for automatically positioning said fastener members in rows in spaced corresponding positions.

2. In an apparatus for arranging the fastener members of sliding-clasp fasteners in rows, the combination of a hopper for containing a supply of fastener members, a movable transfer device adapted to receive said fastener members from said hopper in individual spaced sequence, mechanism including a clutch for operating said transfer device, a chute to which said fastener members are delivered by said transfer device, a feeler movable into and out of said chute, cams continuously operated by said mechanism, linkage operated by said cams for moving said feeler into and out of said chute and for controlling said clutch whereby, upon overfilling of said chute, said feeler is held in retracted position, a pawl and ratchet included in said linkage for adjusting said clutch to an inoperative position as said feeler is held in said retracted position, a release lever for releasing said pawl, as said overfilling of the chute is corrected, and means for automatically adjusting said clutch to its operative position when said pawl is released.

3. In an apparatus for arranging the fastener members of sliding-clasp fasteners in rows, the combination of a hopper for containing a supply of fastener members, a movable transfer device adapted to receive said fastener members from said hopper in individual spaced sequence, a chute to which said fastener members are delivered by said transfer device, an intermittently actuated slide, spaced parallel combs on said slide, a stationary section of said apparatus above said slide provided with spaced parallel grooves above and in registry with said combs, a transverse slide movable beneath said chute and adapted to transfer successive fastener members from said chute alternately into said parallel grooves, and auxiliary slides for transferring said fastener members from said grooves to said combs.

4. In an apparatus for arranging the fastener members of sliding-clasp fasteners in rows, the combination of a hopper for containing a supply of fastener members, a movable transfer device adapted to receive said fastener members from said hopper in individual spaced sequence, a chute to which said fastener members are delivered by said transfer device, an intermittently actuated slide, spaced parallel combs on said slide, a stationary section of said apparatus above said slide provided with spaced parallel grooves above and in registry with said combs, a transverse slide movable beneath said chute and adapted to transfer successive fastener members from said chute alternately into said parallel grooves, auxiliary slides for transferring said fastener members from said grooves to said combs, and a holding device for retaining the fastener members above the terminal fastener member in said chute until the transverse slide is in receiving relation to said chute.

5. In an apparatus for arranging the fastener members of sliding-clasp fasteners in rows, the combination of a hopper for containing a supply of fastener members, a movable transfer device adapted to receive said fastener members from said hopper in individual spaced sequence, a chute to which said fastener members are delivered by said transfer device, an intermittently actuated slide, spaced parallel combs on said slide, a stationary section of said apparatus above said slide provided with spaced parallel grooves above and in registry with said combs, a transverse slide movable beneath said chute and adapted to transfer successive fastener members from said chute alternately into said parallel grooves, said transverse slide being provided with inclined wedge surfaces, a holding device for retaining the fastener members above the terminal fastener member in said chute until the transverse slide is in receiving relation to said chute, and means controlled by said wedge surfaces for operating said holding device.

6. In an apparatus for arranging the fastener members of sliding-clasp fasteners in rows, the combination of a hopper for containing a supply of fastener members, a movable transfer device adapted to receive said fastener members from said hopper in individual spaced sequence, a chute to which said fastener members are delivered by said transfer device, an intermittently actuated slide, spaced parallel combs on said slide, a stationary section of said apparatus above said slide provided with spaced parallel grooves above and in registry with said combs, a transverse slide movable beneath said chute and adapted to transfer successive fastener members from said chute alternately into said parallel grooves, auxiliary slides for transferring said fastener members from said grooves to said combs, a holding device for retaining the fastener members above the terminal fastener member in said chute until the transverse slide is in receiving relation to said chute, an operating lever connected with said holding device, a manually operable slide, and a lifting surface on said last named slide adapted to actuate said operating lever whereby said holding device may be manually adjusted to maintain said fastener members in said chute.

7. In an apparatus for arranging the fastener members of sliding-clasp fasteners in rows, the combination of a hopper for containing a supply of fastener members, a movable transfer device adapted to receive said fastener members from said hopper in individual spaced sequence, a chute to which said fastener members are delivered by said transfer device, an intermittently actuated slide provided with ratchet teeth, means including an operating pawl co-operating with said ratchet teeth to advance said slide, a stop pawl co-operating with said teeth to prevent a return movement of said slide, spaced parallel combs carried by said slide, a transverse slide movable beneath said chute and controlling the transfer of successive fastener members from said chute to said combs in alternate sequence, a manually operable slide, lifting surfaces on said last named slide, and pins on said pawls adapted to be engaged by said lifting surfaces to shift said pawls out of engagement with the ratchet teeth of said intermittently actuated slide to permit the latter to be returned to its initial position.

8. In an apparatus for arranging the fastener members of sliding-clasp fasteners in rows, the combination of a hopper for containing a supply of fastener members, a movable transfer device adapted to receive said fastener members from said hopper in individual spaced sequence, a chute to which said fastener members are delivered by said transfer device, an intermittently actuated slide, spaced parallel combs carried by said slide, means for transferring said fastener members from said chute to said combs to position said fastener members in two rows, and means for automatically arresting the transfer of said fastener members from said chute at intervals of predetermined duration independently of the movement of said intermittently actuated slide whereby the fastener members on said combs are separated into groups to produce sliding-clasp fasteners of varying lengths.

9. In an apparatus for arranging the fastener members of sliding-clasp fasteners in rows, the combination of a hopper for containing a supply of fastener members, a movable transfer device adapted to receive said fastener members from said hopper in individual spaced sequence, a chute to which said fastener members are delivered by said transfer device, an intermittently actuated slide, spaced parallel combs carried by said slide, means for transferring said fastener members from said chute to said combs to position said fastener members in two rows, a holding device for retaining the fastener members in said chute, an operating lever for said holding device, a roller carried by said lever, and a template rail movable with said slide and provided with rises of predetermined dimensions adapted to act on said roller and operating lever to adjust said holding device to an operative position whereby gaps of predetermined extent are automatically formed in each row of fastener members on said combs.

10. In an apparatus for arranging the fastener members of sliding-clasp fasteners in rows, the combination of a hopper for containing a supply of fastener members, a movable transfer device adapted to receive said fastener members from said hopper in individual spaced sequence, a chute to which said fastener members are delivered by said transfer device, an intermittently actuated slide, spaced parallel combs carried by said slide, means for transferring said fastener members from said chute to said combs to position said fastener members in two rows, driving means for said apparatus, means including a lever for starting and arresting the operation of said driving means, and a stop mounted on said slide at a predetermined point and adapted to engage and operate said lever whereby the operation of said driving means is automatically arrested at the end of a predetermined working cycle.

11. In automatic mechanism for arranging fastener members of slide-fasteners in rows including a delivery magazine in which said fastener members are superposed in vertical position with the shanks of said members projecting downwardly for connection with a stringer, and means for intermittently feeding said stringer in steps corresponding to one member, the plane of said stringer being in the vertical symmetry plane of said magazine, that improvement which comprises a holding device for maintaining said members in said magazine, a transfer device, means for operating said holding device coincidentally with a feeding movement of said stringer to permit the terminal fastener member in said magazine to drop to said transfer device, means for operating said transfer device to bring the fastener member carried thereby into proper position relatively to the stringer, means operated during a subsequent feeding movement of said stringer for setting the fastener member carried by said transfer device upon said stringer, and means operative after a predetermined number of feeding movements of said stringer whereby the holding device is fixed against operation to prevent delivery of fastener members from said magazine and said stringer is fed to a predetermined extent without receiving fastener members, said last named means including a device adjustable to vary the point in the feeding movements of the stringer at which said holding device is fixed against operation.

12. In automatic mechanism for arranging fastener members of slide-fasteners in rows including a delivery magazine in which said fastener members are superposed in vertical position with the shanks of said members projecting downwardly for connection with a stringer, and means for intermittently feeding said stringer in steps corresponding to one member, the plane of said stringer being in the vertical symmetry plane of said magazine, that improvement which comprises a holding device for maintaining said members in said magazine, a transfer device, means for operating said holding device coincidentally with a feeding movement of said stringer to permit the terminal fastener member in said magazine to drop to said transfer device, means for operating said transfer device to bring the fastener member carried thereby into proper position relatively to the stringer, means operated during a subsequent feeding movement of said stringer for setting the fastener member carried by said transfer device upon said stringer, means operative after a predetermined number of feeding movements of said stringer whereby the holding device is fixed against operation to prevent delivery of fastener members from said magazine and said stringer is fed to a predetermined extent without receiving fastener members, means connected with the stringer feeding means for storing operating energy as the latter is actuated, and means for releasing said energy storing means at a predetermined point whereby said stringer feeding means is operated in a return direction to a given extent.

13. An automatic mechanism according to claim 11 in which the magazine is provided with a hole and the holding device consists of a pin adapted to project inwardly through said hole between the shanks of the penultimate fastener member in said magazine, and a transfer device on which the terminal fastener member coincidentally is supported.

14. An automatic mechanism according to claim 11 in which the transfer device consists of a feeder slide provided with a T-shaped slot open at the front and adapted to be adjusted into registry with the magazine to receive the terminal fastener member therefrom and carry it into position for attachment to the stringer.

15. In automatic mechanism for arranging the fastener members of sliding-clasp fasteners in rows, the combination of a magazine for containing fastener members in superposed relation, a feeder slide for receiving fastener members from said magazine in individual succession, a holding pin adapted to extend into said magazine above the terminal member therein to maintain the remaining members against delivery from said magazine, a driven shaft, a lever mounted on said shaft and connected with said feeder slide for operating the same, a countershaft, a second lever loosely mounted on said shaft and connected with said holding pin, a first pinion fixed on said driven shaft, a second pinion loosely mounted on said auxiliary shaft and meshing with said first pinion, means for flexibly coupling said loose pinion to said auxiliary shaft, an arm secured on said countershaft, and a yielding connection between said arm and said second lever whereby the latter is operated in inverse relation to said feeder slide and is capable of yielding upon encountering obstructing forces in said magazine.

16. In automatic mechanism for arranging the fastener members of sliding-clasp fasteners in rows on a stringer, the combination of a magazine for containing fastener members in superposed relation, a feeder slide provided with a slot for receiving fastener members from said magazine in individual succession, means for intermittently moving said stringer in receiving relation to said feeder slide, a vertically movable toothed jaw for forcing the fastener member from the slot of said feeder slide into position on said stringer, a pair of toothed jaws oppositely movable in a horizontal path perpendicular to said stringer for clamping said fastener member on said stringer, said horizontally movable jaws engaging a plurality of previously clamped members in addition to the member being clamped in place, and means for initially operating said vertically movable jaw and for subsequently actuating said horizontally movable jaws.

17. In automatic mechanism for arranging the fastener members of sliding-clasp fasteners in rows on an intermittently movable stringer, the combination of a magazine for containing fastener members in superposed relation, a feeder slide in delivery relation to the stringer and provided with a slot for receiving fastener members from said magazine in individual succession, an operating shaft, a vertically movable toothed jaw, a bell-crank lever operatively connected with said vertically movable jaw, an operating rod connected with said bell-crank lever, an eccentric mounted on said shaft for actuating said operating rod and bell-crank lever whereby said vertically movable jaw is operated to force the fastener member from the slot of said feeder slide into position on said stringer, a pair of horizontally movable toothed jaws, slides carrying said last named jaws, a spindle provided with right and left handed threads in threaded engagement respectively with said slides, an arm fixed upon said spindle, a connecting rod secured to said arm, and a second eccentric on said shaft for operating said connecting rod and arm whereby said spindle is rocked on its axis and said horizontally movable jaws are actuated to clamp said fastener member on said stringer.

18. In automatic mechanism for arranging the fastener members of sliding-clasp fasteners in rows, the combination of a magazine for containing fastener members in superposed relation, a feeder slide for receiving fastener members from said magazine in individual succession, a holding pin adapted to extend into said magazine above the terminal member therein to maintain the remaining members against delivery from said magazine, operating means for moving said holding pin into and out of said magazine, a shaft, a ratchet wheel loosely mounted on said shaft and provided in its one face with a groove concentric to its axis, a stop adjustably mounted in said groove and provided with an operative surface of given length concentric to the axis of said ratchet wheel, means for operating said ratchet wheel in successive steps, and a lever connected with the pin operating means and adapted to co-operate with the concentric operative surface of said stop whereby said holding pin is held within said magazine for a predetermined period during the rotation of said ratchet wheel to prevent delivery of said fastener members from said magazine during said period.

19. In automatic mechanism for arranging the fastener members of sliding-clasp fasteners in rows, the combination of a magazine for containing fastener members in superposed relation, a feeder slide for receiving fastener members from said magazine in individual succession, a holding pin adapted to extend into said magazine above the terminal member therein to maintain the remaining members against delivery from said magazine, operating means for moving said holding pin into and out of said magazine, a shaft, a ratchet wheel loosely mounted on said shaft and provided in its one face with a groove concentric to its axis, a stop adjustably mounted in said groove and provided with an operative surface of given length concentric to the axis of said ratchet wheel, a spiral spring connected with said shaft and with said ratchet wheel, means including an operating pawl for rotating said ratchet wheel in successive steps and for winding said spiral spring to store operating energy therein, a stop pawl normally holding said ratchet wheel against return rotation, means arranged to co-operate with the concentric operative surface of said stop whereby said holding pin is held within said magazine for a predetermined period during the rotation of said ratchet wheel to prevent delivery of said fastener members from said magazine during said period, and means engaged by said stop subsequently to said period to disengage said operating and stop pawls from said ratchet wheel whereby the latter is returned to its initial position by the action of said spiral spring.

20. In automatic mechanism for arranging the fastener members of sliding-clasp fasteners in rows, the combination of a magazine for containing fastener members in superposed relation, a feeder slide for receiving fastener members from said magazine in individual succession, a holding pin adapted to extend into said magazine above the terminal member therein to maintain the remaining members against delivery from said magazine, operating means for moving said holding pin into and out of said magazine, a shaft, a ratchet wheel loosely mounted on said shaft and provided in its one face with a groove concentric to its axis, a stop adjustably mounted in said groove and provided with an operative surface of given length concentric to the axis of said ratchet wheel, a spiral spring connected with said shaft and with said ratchet wheel, means including an operating pawl for rotating said ratchet wheel in successive steps and for winding said spiral spring to store operating energy therein, a stop pawl normally holding said ratchet wheel against return rotation, means arranged to cooperate with the concentric operative surface of said stop whereby said holding pin is held within said magazine for a predetermined period during the rotation of said ratchet wheel to prevent delivery of said fastener members from said magazine during said period, means engaged by said stop subsequently to said period to disengage said operating and stop pawls from said ratchet wheels whereby the latter is returned to its initial position by the action of said spiral spring, a main driving shaft, and means operated from said main shaft whereby said operating and stop pawls are returned into engagement with said ratchet wheel at the end of the return movement thereof.

21. In automatic mechanism for arranging the fastener members of sliding-clasp fasteners in rows, the combination of a magazine for containing fastener members in superposed relation, a holding pin adapted to extend into said magazine above the terminal member therein to maintain the remaining members against delivery from said magazine, operating means for moving said holding pin into and out of said magazine, a rotatable main ratchet wheel, a stop adjustably mounted on said main ratchet wheel and adapted to arrest the operation of said pin operating means whereby said pin is held in said magazine for a predetermined operative period during the rotation of said main ratchet wheel to prevent delivery of fastener members from said magazine during said period, means including an operating pawl and a stop pawl for controlling the operation of said main ratchet wheel, tripping means engaged by said stop subsequently to said period for disengaging said pawls from said main ratchet wheel, means for returning the latter to its initial position when said pawls are disengaged, an operating shaft, a second ratchet wheel, a pawl driven from said operating shaft for advancing said second ratchet wheel in steps, a spring whereby said second ratchet wheel is normally returned subsequent to each advance thereof, an auxiliary pawl normally out of engagement with said second ratchet wheel and adapted to engage and operate the same when said tripping means is operated to disengage said pawls from said main ratchet wheel, a bar connected with said tripping means, an arm carried by said second ratchet wheel, and a connection between arm and bar permitting a predetermined amount of movement of said arm relatively to said bar, the latter at the end of said relatively free movement being actuated by said arm to operate said tripping means to restore the operating and stop pawls into operative engagement with said main ratchet wheel.

22. In automatic mechanism for arranging the fastener members of sliding-clasp fasteners in rows, the combination of a magazine for containing fastener members in supersposed relation, a holding pin adapted to extend into said magazine above the terminal member therein to maintain the remaining members against delivery from said magazine, operating means for moving said holding pin into and out of said magazine, a rotatable main ratchet wheel, a stop adjustably mounted on said main ratchet wheel and adapted to arrest the operation of said pin operating means whereby said pin is held in said magazine for a predetermined operative period during the rotation of said main rachet wheel to prevent delivery of fastener members from said magazine during said period, means including an operating pawl and a stop pawl for controlling the operation of said main ratchet wheel, tripping means engaged by said stop subsequently to said period for disengaging said pawls from said main ratchet wheel, means for returning the latter to its initial position when said pawls are disengaged, an operating shaft, a second ratchet wheel, a pawl driven from said operating shaft for advancing said second rachet wheel in steps, a spring whereby said second ratchet wheel is normally returned subsequent to each advance thereof, an auxiliary pawl normally out of engagement with said second ratchet wheel and adapted to engage and operate the same when said tripping means is operated to disengage said pawls from said main ratchet wheel, a bar connected with said tripping means and provided with a slot, an arm carried by said second ratchet wheel, and a pin mounted on said arm and extending into the slot of said bar and intermittently movable lengthwise thereof to finally engage an end of said slot and thereby operate said bar and tripping means whereby said operating and stop pawls are restored into operative engagement with said main ratchet wheel.

23. In an apparatus for arranging the fastener members of sliding-clasp fasteners in rows, the combination of a hopper for containing a supply of fastener members, a movable transfer device adapted to receive said fastener members from said hopper in individual spaced sequence, means whereby fastener members improperly positioned on said transfer device are automatically removed therefrom and returned to said hopper, a chute to which said fastener members are delivered by said transfer device, a feeler at the upper portion of said chute automatically movable into and out of said chute and adapted to arrest the operation of said transfer device when the filling of fastener members in said chute reaches the level of said feeler, and means to which said fastener members are transferred by said chute and automatically disposed in rows in spaced corresponding positions.

HELMUT GUTBERLETT.